United States Patent
Ravindran et al.

(10) Patent No.: US 10,575,067 B2
(45) Date of Patent: Feb. 25, 2020

(54) CONTEXT BASED AUGMENTED ADVERTISEMENT

(71) Applicant: Samsung Electronics Co., Ltd., Suwon-si, Gyeonggi-do (KR)

(72) Inventors: Sourabh Ravindran, Dallas, TX (US); Youngjun Yoo, Plano, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/473,272

(22) Filed: Mar. 29, 2017

(65) Prior Publication Data

US 2018/0192160 A1 Jul. 5, 2018

Related U.S. Application Data

(60) Provisional application No. 62/442,117, filed on Jan. 4, 2017.

(51) Int. Cl.
*H04H 60/32* (2008.01)
*H04N 21/81* (2011.01)
*G06Q 30/02* (2012.01)
*H04N 21/234* (2011.01)

(52) U.S. Cl.
CPC ....... *H04N 21/812* (2013.01); *G06Q 30/0277* (2013.01); *H04N 21/23418* (2013.01); *H04N 21/23424* (2013.01); *G06Q 30/0252* (2013.01); *G06Q 30/0261* (2013.01)

(58) Field of Classification Search
CPC ........... H04N 21/812; H04N 21/23424; H04N 21/2668; H04N 21/23418; H04N 21/25891

USPC .......................................................... 725/14
See application file for complete search history.

(56) References Cited

U.S. PATENT DOCUMENTS

| | | | |
|---|---|---|---|
| 6,100,925 A * | 8/2000 | Rosser | G01S 3/7864 348/169 |
| 6,403,597 B1 | 6/2002 | Wilson et al. | |
| 7,073,129 B1 | 7/2006 | Robarts et al. | |
| 7,342,166 B2 | 3/2008 | Kay | |
| 7,796,781 B2 | 9/2010 | Echigo et al. | |
| 7,849,227 B2 | 12/2010 | Kashiyama et al. | |
| 7,882,087 B2 | 2/2011 | Johnson | |

(Continued)

FOREIGN PATENT DOCUMENTS

| KR | 20120025211 A | 3/2012 |
|---|---|---|
| KR | 101519047 B1 | 5/2015 |

(Continued)

OTHER PUBLICATIONS

International Search Report and Written Opinion dated Nov. 30, 2018 for International Application PCT/KR2017/008745 from Korean Intellectual Property Office, pp. 1-13, Republic of Korea.

(Continued)

*Primary Examiner* — Michael B. Pierorazio
(74) *Attorney, Agent, or Firm* — Sherman IP LLP; Kenneth L. Sherman; Hemavathy Perumal (57) ABSTRACT

One embodiment provides a method comprising analyzing one or more frames of a piece of content to determine a context of the one or more frames, determining a product to advertise in the piece of content based on the context, and augmenting the piece of content with a product placement for the product. The product placement appears to occur naturally in the piece of content.

25 Claims, 6 Drawing Sheets

(56) References Cited

U.S. PATENT DOCUMENTS

| | | | |
|---|---|---|---|
| 7,994,930 B2 | 8/2011 | Gajdos et al. | |
| 8,220,020 B2 | 7/2012 | Deshpande | |
| 8,413,182 B2 * | 4/2013 | Bill | G06Q 30/02 725/34 |
| 8,477,246 B2 | 7/2013 | Saxena et al. | |
| 8,501,422 B2 | 8/2013 | Eszter et al. | |
| 8,527,345 B2 | 9/2013 | Rothschild et al. | |
| 8,655,718 B2 | 2/2014 | Atsani et al. | |
| 8,682,925 B1 | 3/2014 | Marquardt et al. | |
| 8,745,070 B2 | 6/2014 | Krishnamurthy et al. | |
| 8,910,201 B1 | 12/2014 | Zamiska et al. | |
| 8,922,617 B2 | 12/2014 | Alexandrov et al. | |
| 8,949,889 B1 | 2/2015 | Erdmann et al. | |
| 8,954,377 B1 | 2/2015 | Turon et al. | |
| 8,977,293 B2 | 3/2015 | Rodriguez et al. | |
| 9,009,083 B1 | 4/2015 | Shetty et al. | |
| 9,078,048 B1 | 7/2015 | Gargi et al. | |
| 9,097,891 B2 | 8/2015 | Border et al. | |
| 9,224,156 B2 | 12/2015 | Moorer | |
| 9,264,711 B2 | 2/2016 | Gordon et al. | |
| 9,269,015 B2 | 2/2016 | Boncyk et al. | |
| 9,272,203 B2 | 3/2016 | Zalewski et al. | |
| 9,272,209 B2 | 3/2016 | Perlman et al. | |
| 9,286,721 B2 | 3/2016 | Adhikari et al. | |
| 9,317,972 B2 | 4/2016 | Forutanpour et al. | |
| 9,384,594 B2 | 7/2016 | Maciocci et al. | |
| 9,633,479 B2 | 4/2017 | Grasso et al. | |
| 10,091,556 B1 * | 10/2018 | Liden | H04N 21/47815 |
| 10,163,049 B2 | 12/2018 | Tout et al. | |
| 2003/0028432 A1 | 2/2003 | Troyansky et al. | |
| 2006/0173743 A1 | 8/2006 | Bollay | |
| 2007/0124762 A1 | 5/2007 | Chickering et al. | |
| 2008/0109306 A1 | 5/2008 | Maigret et al. | |
| 2008/0172293 A1 | 7/2008 | Raskin et al. | |
| 2009/0094113 A1 | 4/2009 | Berry et al. | |
| 2010/0023398 A1 | 1/2010 | Brown et al. | |
| 2010/0088716 A1 | 4/2010 | Ellanti et al. | |
| 2011/0041153 A1 | 2/2011 | Simon et al. | |
| 2011/0153414 A1 | 6/2011 | Elvekrog et al. | |
| 2011/0173071 A1 | 7/2011 | Meyer et al. | |
| 2011/0184805 A1 | 7/2011 | Margalit et al. | |
| 2012/0011540 A1 | 1/2012 | Pulford et al. | |
| 2012/0086727 A1 | 4/2012 | Korah et al. | |
| 2012/0100915 A1 | 4/2012 | Margalit et al. | |
| 2012/0110616 A1 * | 5/2012 | Kilar | H04N 21/812 725/32 |
| 2012/0167133 A1 | 6/2012 | Carroll et al. | |
| 2013/0073473 A1 | 3/2013 | Heath | |
| 2014/0013342 A1 * | 1/2014 | Swan | H04N 21/2343 725/5 |
| 2014/0052540 A1 | 2/2014 | Rajaram et al. | |
| 2014/0063061 A1 | 3/2014 | Reitan et al. | |
| 2014/0136337 A1 | 5/2014 | Ringdahl | |
| 2014/0236729 A1 | 8/2014 | Sidi et al. | |
| 2014/0289188 A1 | 9/2014 | Shimanovsky et al. | |
| 2014/0310098 A1 | 10/2014 | Epperson et al. | |
| 2014/0317244 A1 | 10/2014 | Pantos et al. | |
| 2015/0081452 A1 | 3/2015 | Anthony | |
| 2015/0082203 A1 | 3/2015 | James et al. | |
| 2015/0082341 A1 * | 3/2015 | Rosenbaum | G06F 3/0484 725/32 |
| 2015/0143416 A1 * | 5/2015 | Onno | H04N 21/4307 725/34 |
| 2015/0172563 A1 | 6/2015 | Jakobson et al. | |
| 2015/0199995 A1 | 7/2015 | Silverstein et al. | |
| 2015/0245111 A1 | 8/2015 | Berry et al. | |
| 2015/0269384 A1 | 9/2015 | Holman et al. | |
| 2015/0302470 A1 | 10/2015 | Dru et al. | |
| 2015/0350563 A1 | 12/2015 | Hendricks et al. | |
| 2016/0004750 A1 | 1/2016 | Marquardt et al. | |
| 2016/0042250 A1 | 2/2016 | Cordova-Diba et al. | |
| 2016/0050465 A1 | 2/2016 | Zaheer et al. | |
| 2016/0092484 A1 | 3/2016 | Finkler | |
| 2016/0112729 A1 | 4/2016 | Sayed et al. | |
| 2016/0140614 A1 | 5/2016 | Brubaker et al. | |
| 2016/0196603 A1 | 7/2016 | Perez et al. | |
| 2016/0209648 A1 | 7/2016 | Haddick et al. | |
| 2016/0212455 A1 | 7/2016 | Manna | |
| 2017/0178156 A1 | 6/2017 | Bruich et al. | |
| 2017/0374398 A1 | 12/2017 | Rao et al. | |
| 2018/0013977 A1 | 1/2018 | Martineau et al. | |
| 2019/0005546 A1 | 1/2019 | Chen et al. | |

FOREIGN PATENT DOCUMENTS

| | | |
|---|---|---|
| WO | 2002037828 A2 | 5/2002 |
| WO | 2011094734 A2 | 8/2011 |
| WO | 2016028813 A1 | 2/2016 |
| WO | 2016109056 A1 | 7/2016 |

OTHER PUBLICATIONS

Cohen, E. et al., "Maintaining Time-Decaying Stream Aggregates" Jan. 25, 2005, pp. 1-16, Elsevier, United States.

U.S. Non-Final Office Action for U.S. Appl. No. 15/616,290 dated Sep. 17, 2018.

Rosman, B. et al., "Learning Spatial Relationships between Objects", Journal International Journal of Robotics Research archive, Sep. 30, 2011, pp. 1328-1342, vol. 30, No. 11, See p. 1329, right column: p. 1332, right column; p. 1333, left column, United Kingdom.

International Search Report and Written Opinion dated Oct. 22, 2018 for International Application PCT /KR2018/006420 from Korean Intellectual Property Office, pp. 1-10, Republic of Korea.

U.S. Final Office Action for U.S. Appl. No. 15/616,290 dated Mar. 12, 2019.

U.S. Non-Final Office Action for U.S. Appl. No. 15/636,360 dated Mar. 22, 2019.

International Search Report and Written Opinion dated Oct. 19, 2018 for International Application PCT /KR2018/007359 from Korean Intellectual Property Office, pp. 1-13, Republic of Korea.

U.S. Advisory Action for U.S. Appl. No. 15/616,290 dated Jun. 6, 2019.

U.S. Non-Final Office Action for U.S. Appl. No. 15/616,290 dated Aug. 8, 2019.

U.S. Final Office Action for U.S. Appl. No. 15/636,360 dated Aug. 22, 2019.

Extended European Search Report dated Jul. 2, 2019 for European Application No. 17889825.0 from European Patent Office, pp. 1-15, Munich, Germany.

Extended European Search Report dated Oct. 4, 2019 for European Application No. 17889825.0 from European Patent Office, pp. 1-11, Munich, Germany.

* cited by examiner

CONTEXT BASED AUGMENTED ADVERTISEMENT

CROSS REFERENCE TO RELATED APPLICATIONS

This application claims priority from U.S. Provisional Patent Application Ser. No. 62/442,117, filed on Jan. 4, 2017, incorporated herein by reference.

TECHNICAL FIELD

One or more embodiments relate generally to product placement and advertising, and in particular, a system and a method for context based augmented advertisement.

BACKGROUND

To enhance sales and brand value of a product (e.g., goods, services), an advertiser of the product or a producer of the product may pay a content creator to include an advertisement relating to the product in content produced/created by the content creator.

SUMMARY

One embodiment provides a method comprising analyzing one or more frames of a piece of content to determine a context of the one or more frames, determining a product to advertise in the piece of content based on the context, and augmenting the piece of content with a product placement for the product. The product placement appears to occur naturally in the piece of content.

Another embodiment provides a method comprising gathering contextual information associated with an electronic signage, determining a product to advertise on the electronic signage based on the contextual information, and updating a display of the electronic signage with product placement content for the product.

These and other features, aspects and advantages of the one or more embodiments will become understood with reference to the following description, appended claims and accompanying figures.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries or treatises.

One embodiment provides a method comprising analyzing one or more frames of a piece of content to determine a context of the one or more frames, determining a product to advertise in the piece of content based on the context, and augmenting the piece of content with a product placement for the product. The product placement appears to occur naturally in the piece of content.

Another embodiment provides a method comprising gathering contextual information associated with an electronic signage, determining a product to advertise on the electronic signage based on the contextual information, and updating a display of the electronic signage with product placement content for the product.

For expository purposes, the term "product" as used herein generally refers to, for example, a good (e.g., an object or an item) or a service (e.g., an action). Examples of products include, but are not limited to, soft drinks, cars, smartphones, cellular services, or fast food restaurants.

For expository purposes, the term "media content" as used herein generally refers to, for example, visual content, such as images, videos, video games, digital pictures, movies, television shows, or any other type of visual content that is displayable on a display device (e.g., a television, a monitor, tablet, or electronic signage). Media content may be produced/created by a content creator (e.g., a user or a media content provider) and hosted on a content server for distribution (e.g., movies or television shows), or captured by a user and privately maintained on a device of the user (e.g., personal/private videos or pictures). The terms "media content" and "visual content" may be used interchangeably.

For expository purposes, the term "product placement" generally refers to, for example, a visual content/visual representation of a product, such as an object, an advertisement, an image, a video, or a three-dimensional (3D) structural model of the product. Examples of product placement include, but are not limited to, visual representations of a can of a particular soft drink brand, a person drinking a can of a particular soft drink brand, a person listening to a music player of a particular brand, or a car of a particular brand.

Traditionally, an advertisement relating to a product is included in/added to a piece of content during post-processing of the content. For example, if the piece of content comprises video, the advertisement may be inserted between some video frames of the video or as an overlay on the video frames. In recent years, however, many content consumers typically utilize advertisement (ad) blocking software to remove or alter an advertisement included in content. As such, the effectiveness of advertisements has declined as content consumers can easily block most advertisements using such ad blocking software. Further, advertisements included in a piece of content may have little or no relation to the content itself, resulting in lack of user interest in and user engagement with the advertisements.

Conventional techniques utilize a bottom-up approach for product placement. For example, some conventional techniques start with a given product and determine a best product placement opportunity for the product in a piece of content using either conventional vision processing methods or machine learning.

One embodiment provides a framework that utilizes a top-down approach for product placement. Specifically, the framework starts with a given piece of content and analyzes the piece of content to determine an appropriate product to advertise in the piece of content (i.e., a product suitable to advertise in the piece of content). In one embodiment, the framework applies one or more vision based scene modeling techniques to a scene of the piece of content to perform scene classification and annotation to extract high-level semantics of the scene. The framework automatically determines an appropriate product to advertise in the scene (i.e., a product that is a good fit for the scene) based on the semantics extracted. For example, if the piece of content comprises a video including a sky diving scene, the framework may automatically determine that a particular brand of energy drink is a good fit for the scene.

In one embodiment, the framework creates a scene profile for one or more scenes of a piece of content utilizing one or more vision based scene modeling techniques. Auxiliary information may be incorporated into the scene profile based on user-provided tags or sensor data captured via sensors (e.g., audio sensors or GPS). The scene profile comprises one or more descriptors for the scenes, where the descriptors fully embody semantics of the piece content and its context. Some of the descriptors may be derived from vision based scene modeling of the scenes and/or analysis of audio data included in the piece of content. The framework maps the descriptors included in the scene profile to an appropriate product to advertise in the scenes, thereby ensuring that the product advertised is relevant and increasing user engagement.

In one embodiment, the framework places product placements and/or advertisements in a piece of content naturally (i.e., the product placements and/or advertisements appear to occur naturally). For example, in response to determining an appropriate product to advertise in a scene, the framework applies vision techniques to perform scene segmentation to identify a location in the scene for natural insertion of a product placement for the product, and augments the scene with the product placement. The product placement appears to occur naturally in the scene, such that a viewer is unlikely to perceive the product placement as unnatural to the scene. As the product placement is not interruptive, the product placement provides a better viewing experience compared to traditional advertisements. Further, the product placement inserted has a semantic relationship to the piece of content, thereby increasing its appeal to content consumers and improving user engagement.

In one embodiment, the framework is utilized during creation of a piece of content to augment a scene of the piece of content with a natural product placement. As product placements generated by the framework are inserted into a piece of content during creation of the piece of content, the product placements are not removable using ad blocking software.

In one embodiment, augmentation of a piece of content with product placements may be implemented real-time on a device.

Figure 1:
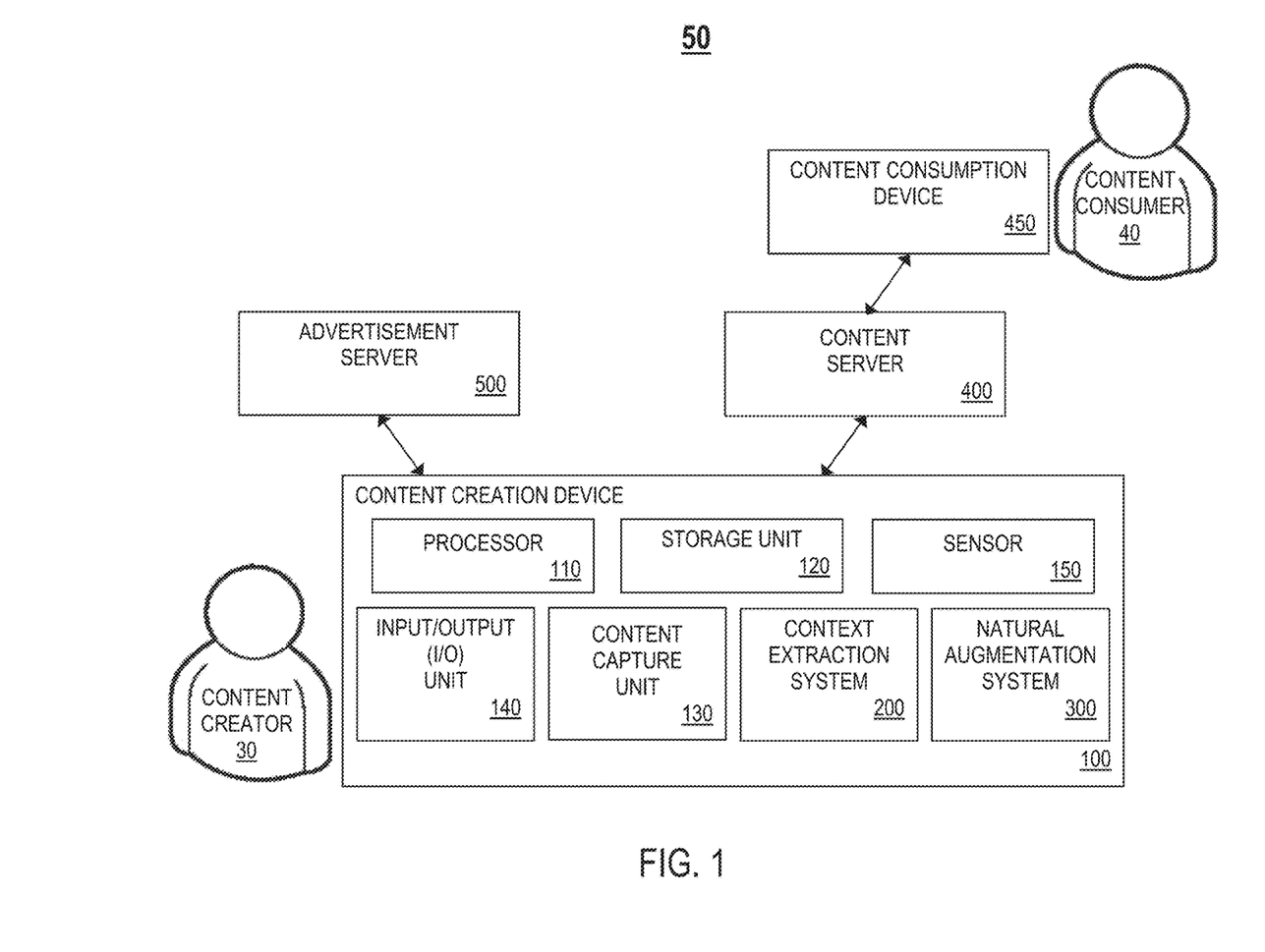
FIG. 1 illustrates an example system for augmenting content with context based advertising, in one or more embodiments.

FIG. 1 illustrates an example system 50 for augmenting content with context based advertising, in one or more embodiments. The system 50 comprises an electronic content creation device 100 including computation resources, such as one or more processors 110 and one or more storage units 120. One or more applications may execute/operate on the content creation device 100 utilizing the computation resources of the content creation device 100.

In one embodiment, the applications include, but are not limited to, the following: (1) a content capture unit 130 for capturing content (e.g., media content, such as video or images), (2) a context extraction system 200 for analyzing the content to determine corresponding contextual information, and determining one or more products to advertise in the content based on the contextual information, and (3) a natural augmentation system 300 for augmenting the content with one or more product placements advertisements associated with the one or more products. As described in detail later herein, the natural augmentation system 300 is configured to dynamically insert/place one or more product placements in content for advertisement purposes, where each product placement inserted appears to occur naturally in the content.

A user (e.g., a content creator 30) may utilize the content creation device 100. Examples of content creation devices 100 include, but are not limited to, mobile devices (e.g., a smart phone, a camera, or a tablet), wearable devices (e.g., a smart watch, an augmented reality (AR) or virtual reality (VR) device such as VR goggles or headsets), or server devices.

In one embodiment, the content creation device 100 comprises one or more input/output (I/O) units 140 integrated in or coupled to the content creation device 100, such as a keyboard, a keypad, a touch interface, or a display screen.

In one embodiment, the content creation device 100 comprises one or more sensors 150 integrated in or coupled to the content creation device 100, such as a camera, a microphone, or GPS. The one or more sensors 150 may be utilized to capture content and/or contextual data. For example, the content capture unit 130 may utilize a camera of the content creation device 100 to capture content. As another example, the context extraction system 200 may utilize the one or more sensors 150 of the content creation device 100 to capture sensor based contextual information, such as a microphone for audio data (e.g., voice recordings) or GPS for location data (e.g., location coordinates).

In one embodiment, the content creation device 100 is configured to exchange data with one or more advertisement servers 500 over a connection (e.g., a wireless connection such as a WiFi connection or a cellular data connection, a wired connection, or a combination of the two). An advertisement server 500 maintains one or more advertisement databases comprising visual representations of one or more products (e.g., advertisements, images, videos, or 3D structural models). As described in detail later herein, the natural augmentation system 300 may augment content with a visual representation retrieved from the advertisement server 500. An advertisement server 500 may be operated/managed by an advertiser or an advertisement broker.

In one embodiment, the content creation device 100 is configured to exchange data with one or more content servers 400 over a connection (e.g., a wireless connection such as a WiFi connection or a cellular data connection, a wired connection, or a combination of the two). As described in detail later herein, the natural augmentation system 300 may upload/send augmented content to a content server 400 (e.g., a broadcast/streaming platform or a content hosting platform) for distribution to one or more other devices, such as a content consumption device 450.

Another user (e.g., a content consumer 40) may utilize the content consumption device 450. Examples of content consumption devices 450 include, but are not limited to, display devices (e.g., a television), mobile devices (e.g., a smart phone or a tablet), or wearable devices (e.g., VR goggles or headsets).

In one embodiment, the context extraction system 200 and/or the natural augmentation system 300 utilizes one or more learned models that are trained offline (i.e., not on the content creation device 100). For example, the learned models may be trained on a remote server. After training, the learned models may be loaded onto/downloaded to the content creation device 100 as a portion of the context extraction system 200 and/or the natural augmentation system 300. In another embodiment, the learned models are trained on the content creation device 100 itself.

Figure 2:
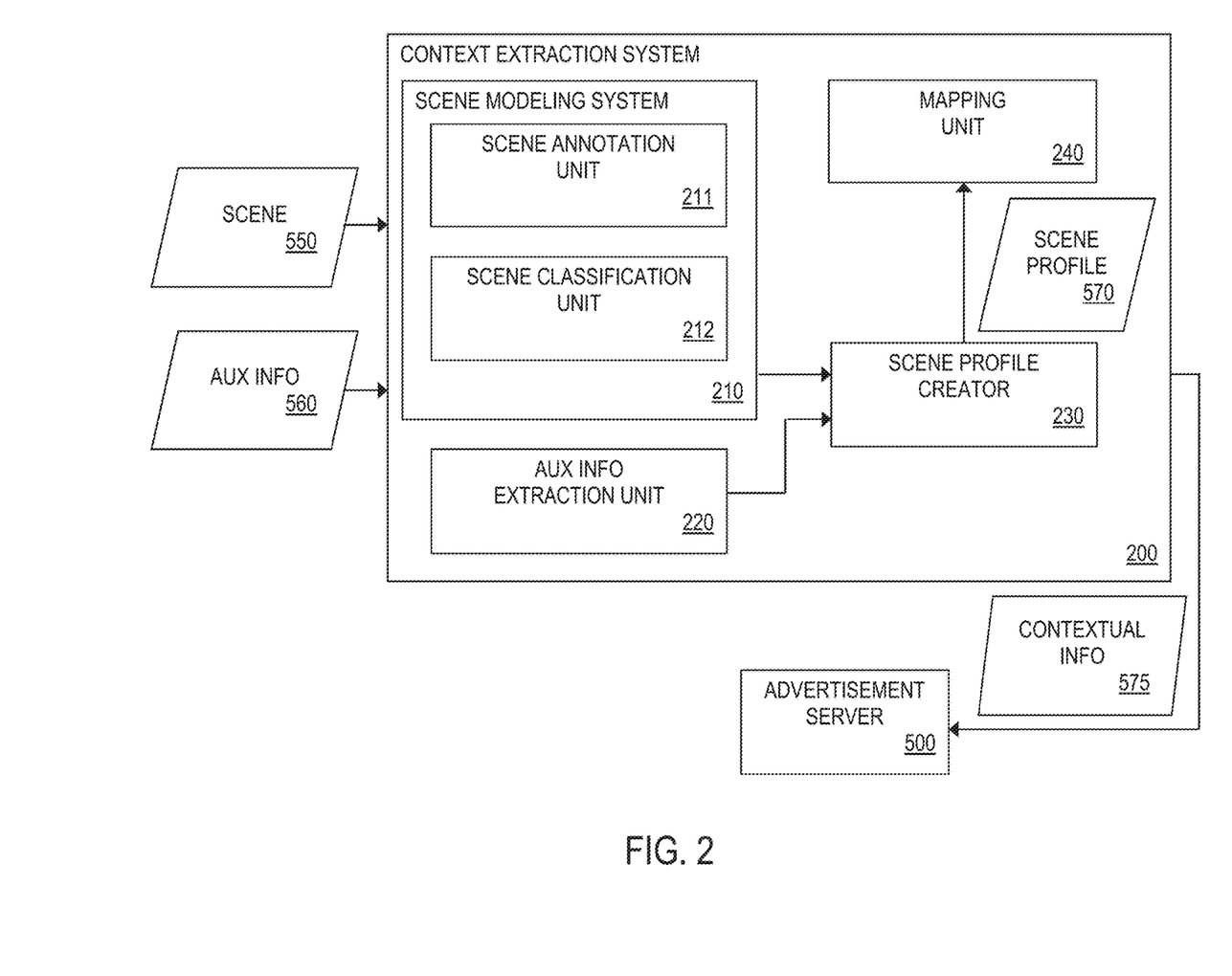
FIG. 2 illustrates an example context extraction system in detail, in one or more embodiments.

FIG. 2 illustrates an example context extraction system 200 in detail, in one or more embodiments. In one embodiment, the context extraction system 200 comprises a scene modeling system 210 configured to analyze one or more frames of a piece of content to extract contextual information from the piece of content. The piece of content may comprise stored media content previously captured by the content capture unit 130 or a live stream of media content captured in real-time by the content capture unit 130.

In one embodiment, the scene modeling system 210 applies one or more vision based scene modeling techniques to the one or more frames to extract high-level semantics indicative of what is occurring in a scene 550 included in the frames (i.e., scene understanding). Specifically, the scene modeling system 210 applies a combination of scene classification and scene annotation to the scene 550 to extract the high-level semantics.

For example, the scene modeling system 210 uses a scene annotation unit 211 to segment the scene 550 into multiple segments, extract one or more features from the multiple segments, and identify one or more individuals objects and/or regions occurring in the scene 550 with one or more descriptors based on the one or more extracted features. Examples of extracted features include, but are not limited to, shape, color, texture, and location of different objects and/or regions occurring in the scene 550. For example, if the scene 550 involves a sky diving event, the one or more descriptors may include, but are not limited to, the following: "plane", "sky", "parachute", or "person".

The scene modeling system 210 then uses a scene classification unit 212 to combine the one or more individuals objects and/or regions identified to extract higher-level information from the scene 550. The higher-level information extracted comprises a higher-level descriptor for the scene 550. For example, if the one or more individuals objects and/or regions identified are relevant to a sky diving event (e.g., "plane", "sky", "parachute", or "person"), the higher-level descriptor for the scene 550 may be "sky diving". In one embodiment, the scene classification unit 212 is based on learned classifiers or rule based logical reasoning.

In one embodiment, the context extraction system 200 comprises an auxiliary information extraction unit 220 configured to extract sensor based contextual information from auxiliary information 560 associated with the scene 550. The auxiliary information 560 comprises data captured by other sources of context. For example, the auxiliary information may comprise user-provided tags (e.g., a tag inputted via an I/O unit 140 of the content creation device 100) and/or sensor data captured by one or more sensors 150 of the content creation device 100, such as audio data (e.g., voice recordings) captured by a microphone or location data (e.g., location coordinates) captured by GPS.

In one embodiment, the context extraction system 200 comprises a scene profile creator 230 configured to generate a scene profile 570 for the scene 550 based on the high-level semantics and the sensor based contextual information extracted. The scene profile 570 comprises one or more descriptors that fully embody semantics of the scene 550 and its context. For example, if the piece of content comprises a video and the scene 550 is a children's soccer match, a scene profile 570 for the scene 550 may include descriptors such as "soccer game", "ball", "park", or "outdoor". If auxiliary information associated with the video comprises audio data capturing the sound of parents shouting encouragement, a descriptor such as "parent video" may be included in the scene profile 570.

In one embodiment, the context extraction system 200 comprises a mapping unit 240 configured to determine an appropriate product to advertise in the scene 550 based on the scene profile 570 generated. Specifically, the mapping unit 240 maps descriptors included in the scene profile 570 to a brand profile representing a product that is suitable for/fits the scene 550. The mapping unit 240 determines a correlation between the scene profile 570 and a brand profile to ensure that a product placement/advertisement to insert in the piece of content is relevant to the piece of content, thereby increasing user engagement. For example, if the scene 550 is a children's soccer match and descriptors such as "soccer game", "ball", "park", "outdoor", and "parent video" are included in the scene profile 570, the mapping unit 240 may map the descriptors to an appropriate product relevant to children's soccer and that appeals to parents.

In one embodiment, a correlation between a scene profile 570 and a brand profile may be learned or rule based. The mapping unit 240 may implement the mapping using rule based techniques, data mining techniques, clustering techniques (e.g., hierarchical clustering), or other types of techniques. For example, a correlation between a higher-level descriptor "sky diving" and a particular brand of energy drink may be learned or enforced as a rule.

In one embodiment, brand profiles are generated offline (e.g., on an advertisement server 500) and then distributed/downloaded to the content creation device 100.

In one embodiment, after the mapping unit 240 determines the appropriate product to advertise in the scene 550, the context extraction system 200 sends contextual information 575 indicative of the product to an advertisement server 500 to request product placement content 580 (FIG. 3) for the product from the advertisement server 500. For example, the contextual information 575 may include a brand profile that the scene profile 570 is mapped to (i.e., the brand profile represents the product that is suitable for/fits the scene 550). In one embodiment, the contextual information 575 may include information identifying a type of placement opportunity available for the product in the scene 550. For example, the type of placement opportunity available may require a 3D image of the product to account for changes in perspective of the product during scene transitions. As another example, the type of placement opportunity available may require only a 2D image of the product (e.g., the scene 550 is augmented with a poster of the product placed on a wall).

Figure 3:
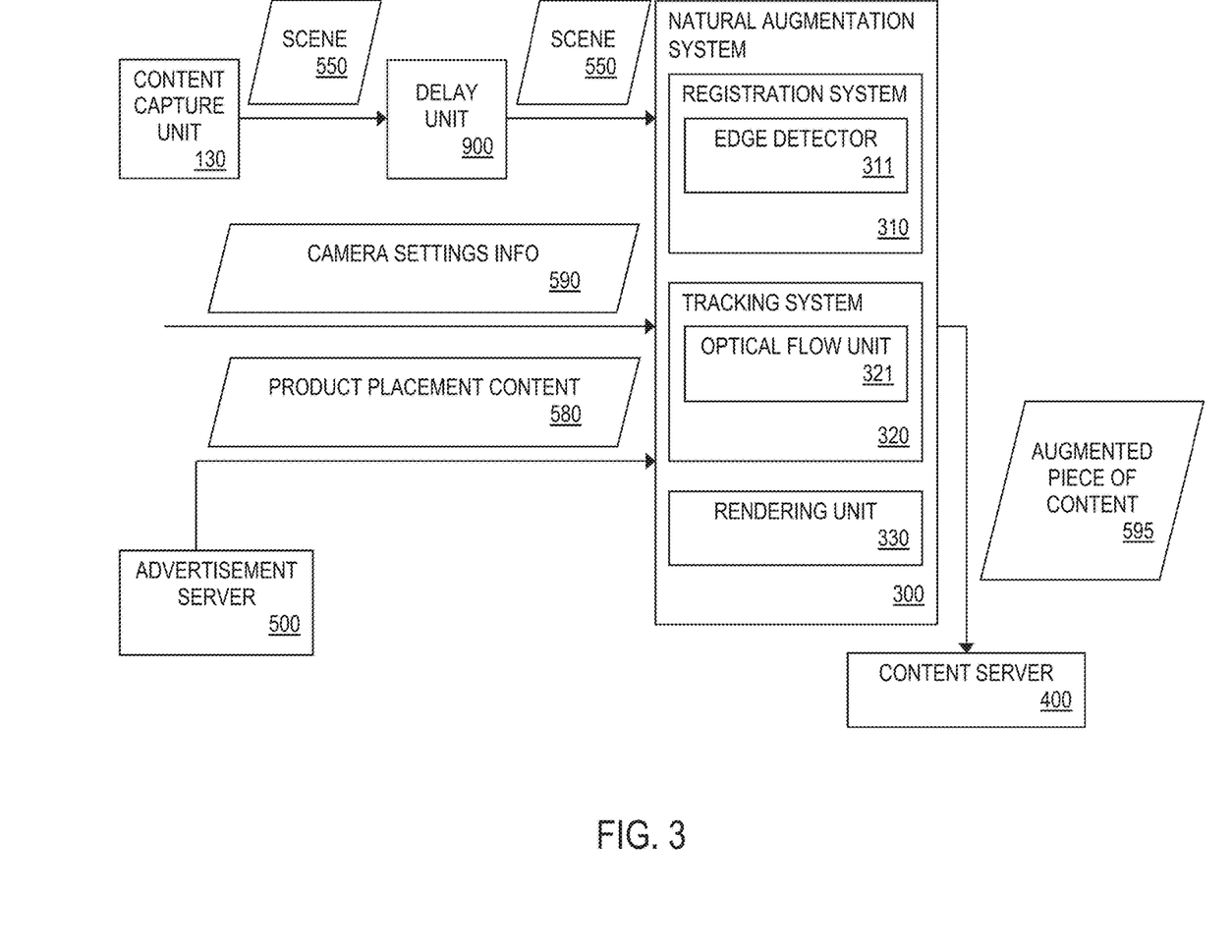
FIG. 3 illustrates an example natural augmentation system in detail, in one or more embodiments.

In one embodiment, the product placement content 580 comprises a visual content/visual representation of the product, such as an object, an advertisement, an image, a video, or a 3D structural model of the product.

FIG. 3 illustrates an example natural augmentation system 300 in detail, in one or more embodiments. In one embodiment, the natural augmentation system 300 is configured to:

(1) receive product placement content 580 for a product from an advertisement server 500, and (2) augment a piece of content with a product placement by inserting and merging (i.e., embedding) the product placement content 580 in a scene 550 occurring in one or more frames of the piece of content, such that the product placement appears to occur naturally in the resulting augmented piece of content 595. The resulting augmented piece of content 595 may be distributed/uploaded to a content server 400.

The piece of content may comprise stored media content previously captured by the content capture unit 130 or a live stream of media content captured in real-time by the content capture unit 130.

In one embodiment, the natural augmentation system 300 augments the piece of content with a product placement in a natural way by applying at least one of the following processes: registration, tracking, and rendering. Registration is the process of extracting structural, depth, and pose information from a scene for aligning a product placement inserted/embedded in the scene with one or more other objects originally occurring in the scene ("real world objects") seamlessly. Tracking is the process of tracking changes in orientation and perspective from one scene (e.g., a current scene) to another scene (e.g., a subsequent scene) to ensure that a product placement inserted/embedded in a scene is rendered in a manner that is consistent with the scene. Rendering is the process of resizing and orienting a product placement when inserting/embedding the product placement in a scene based on structural, depth, and pose information, such that the product placement appears to occur naturally in the scene and any visual interaction between the product placement and one or more real world objects in the scene is seamless.

In one embodiment, the natural augmentation system 300 comprises a registration system 310 for applying registration. The registration system 310 extracts structural, depth, and pose information from the scene 550 to facilitate rendering. The structural, depth, and pose information may be indicative of presence of, position of, and rotation of one or more real world objects in the scene 550. The structural, depth, and pose information may be used to determine a location in the scene 550 to insert the product placement content 580.

In one embodiment, the structural, depth, and pose information extracted comprises structural cues and depth cues. Structural cues may be extracted using one or more learned models, such as learned edge detectors 311 and/or other types of learned object detector models. One or more monocular depth cues may be based on occlusion (e.g., an object in a foreground may block another object in the background), relative size of objects (e.g., objects further away appear smaller), or sharpness of objects (e.g., objects closer to a foreground tend to show more detail).

In one embodiment, the natural augmentation system 300 comprises a tracking system 320 for applying tracking. The natural augmentation system 300 applies tracking if the piece of content comprises video. The ability to track scenes allows the natural augmentation system 300 to predict how a view of a product placement should change from one scene to another scene in real-time. The ability to track scenes also allows the natural augmentation system 300 to implement motion adaption.

For example, when inserting a product placement in the scene 550, the motion of the product placement may move in concert with other motions in the scene 550. Assume the scene 550 includes a table object that is later moved. The tracking system 320 tracks the movement of the table object. If a can object representing a particular soft drink brand is rendered on the table object as a product placement, the visual relation of the can object to the table object may be kept consistent based on the tracked movement of the table object.

As another example, assume the scene 550 includes a moving car. If a billboard object is rendered in a background of the scene 550 as a product placement, the billboard object may gradually become smaller and eventually disappear as the moving car drives away from the billboard object.

In one embodiment, the tracking system 320 uses an optical flow unit 321 that implements optical flow for tracking. In another embodiment, the tracking system 320 uses another unit that implements another process for tracking (e.g., feature based tracking).

In one embodiment, the natural augmentation system 300 comprises a rendering unit 330 for applying rendering. The rendering unit 330 renders a product placement in the scene 550 based on structural, depth, and pose information extracted from the scene 550. The rendering unit 330 modifies scale and rotation of the product placement content 580 by scaling up/down and rotating the product placement content 580 relative to one or more real world objects in the scene 550. For example, rendering a product placement in a foreground of the scene 550 should occlude one or more real world objects positioned behind the product placement. The rendering unit 330 may also modify illumination of the product placement content 580 based on one or more lighting cues derived from shapes and sizes of shadows included in the scene 550 (i.e., illuminating the product placement content 580 based on the one or more lighting cues).

In one embodiment, the natural augmentation system 300 may obtain camera settings information 590 indicative of one or more camera settings of a camera used to capture the piece of content (e.g., a camera integrated in or coupled to the content creation device 100). The rendering unit 330 may render a product placement in the scene 550 based on the camera settings information 590, such that the rendered product placement appears more realistic and has similar image quality to the piece of content in terms of focus, contrast, brightness, ISO level, or ambient illumination.

In one embodiment, to allow time to retrieve the product placement content 580 from the advertisement server 500, a delay unit 900 may buffer one or more frames including the scene 550 to briefly delay propagation of the frames from the content capture unit 130 to the natural augmentation system 300.

In one embodiment, the context extraction system 200 and the natural augmentation system 300 may be used to render virtual advertisements and virtual 3D product placements in VR content. The context extraction system 200 may determine a product appropriate to advertise in the VR content, and the natural augmentation system 300 may generate virtual renderings of product placements and advertisements for the product that are seamlessly inserted in the VR content.

In one embodiment, the context extraction system 200 and the natural augmentation system 300 may be embodied in an AR device to insert product placements and advertisements naturally in AR content. For example, an incoming live camera feed/stream received at the AR device may be analyzed in real-time. Scenes are tracked to ensure that product placements advertisements inserted into the scenes appear to occur naturally and seamlessly. Tracking is critical in such an application scenario as there may not be enough computation resources and/or time to analyze each frame of the AR content multiple times.

In one embodiment, the context extraction system 200 and the natural augmentation system 300 may be embodied in a content consumption device 450 instead of a content creation device 100. If a piece of content received at the content consumption device 450 includes metadata such as camera settings and sensor data, the piece of content may be augmented with a product placement based on the metadata.

In one embodiment, the context extraction system 200 and the natural augmentation system 300 may be embodied in a system controlling product placements and/or advertisements displayed on an electronic signage, such as a large format display (LFD). For example, the context extraction system 200 and the natural augmentation system 300 may change/adapt an advertisement displayed on an LFD based on contextual information associated with the LFD, such as temperature, weather, current events, and an audience member within proximity of the LFD. The contextual information may be captured by one or more sensors (e.g., a temperature sensor, a wide angle camera, or a forward looking camera) and/or received from one or more remote data sources wirelessly or over a wired connection (e.g., a remote database collecting and curating information such as weather or current events).

As another example, the context extraction system 200 and the natural augmentation system 300 may change/adapt a product placement inserted in a scene displayed on an LFD based on contextual information associated with the LFD. Assume the LFD is utilized at a bus stop. If sensors capture a teenager approaching the bus stop, a product placement inserted in a scene displayed on the LFD may change to a product that is more likely to appeal to the teenager, such as a can of Coke®. If sensors capture a working professional approaching the bus stop instead, a product placement inserted in a scene displayed on the LFD may change to a product that is more likely to appeal to the working professional, such as a cup of a Starbucks® coffee.

As another example, the context extraction system 200 and the natural augmentation system 300 may change/adapt an advertisement displayed on an LFD based on an age and/or a gender of an audience member within proximity of the LFD. Specifically, vision processing techniques are applied to a scene captured by a forward looking camera. An audience member in the scene that is closest to the LFD is segmented, and direction of motion of the audience member is determined based on multi-frame analysis. If the direction of motion indicates that the audience member is approaching the LFD (i.e., moving towards the LFD), the audience member is segmented from a background of the scene, and facial and gait analysis along with other attributes such as height and clothes may be used to estimate age and/or gender of the audience member.

As another example, the context extraction system 200 and the natural augmentation system 300 may change/adapt an advertisement displayed on an electronic signage based on an outcome of an event relevant to a location of the signage. For example, if a sports team has lost a match at home, electronic signage at a mass transit stop frequented by supporters of the sports team after the match may display advertisements that are more sympathetic in view of the home loss. The context of the advertisements itself may change in view of the outcome, not just the products advertised. For example, if the outcome of the match is a home victory, the signage may display a can of Pepsi® with the message "Congratulations, let's celebrate with a Pepsi®!" If the outcome of the match is a home loss, the signage may display the same can of Pepsi® (i.e., the same product) but with a different message instead, such as "We will get by together—Pepsi®".

In one embodiment, the context extraction system 200 and the natural augmentation system 300 may embed an advertisement in a video during creation of the video based on context of the video. For example, if a user is creating a video about bungee jumping, the natural augmentation system 300 may embed a can object representing a particular brand of energy drink on a table included in a scene in the video.

In one embodiment, the context extraction system 200 and the natural augmentation system 300 permit augmentation of user generated content with on-the-fly contextual product placements and/or advertisements. For example, if the user generated content comprises an image of a user with a new hairstyle, the natural augmentation system 300 may insert/embed a bottle object representing a particular brand of hair gel in a background of the image before the image is uploaded to a social media platform (e.g., Instagram®).

In one embodiment, the context extraction system 200 and the natural augmentation system 300 may embodied on a content creation device 100 as a streaming service that augments user generated content with natural product placements and advertisements, and streams the resulting augmented user generated content to live broadcasting/streaming platforms (e.g., Live Broadcast from Samsung® or Periscope from Twitter®) or video sharing platforms (e.g., YouTube®). The streaming service may also implement a revenue sharing scheme/model in which advertisement revenue associated with the natural product placements and advertisements is shared with a creator of the user generated content (e.g., a user of the content creation device 100). The revenue sharing scheme may incentive sales of devices providing the streaming service.

In one embodiment, the natural augmentation unit 300 reports the product placement to an advertisement server 500 for management of sharing of advertisement revenue associated with the product placement.

Figure 4A:
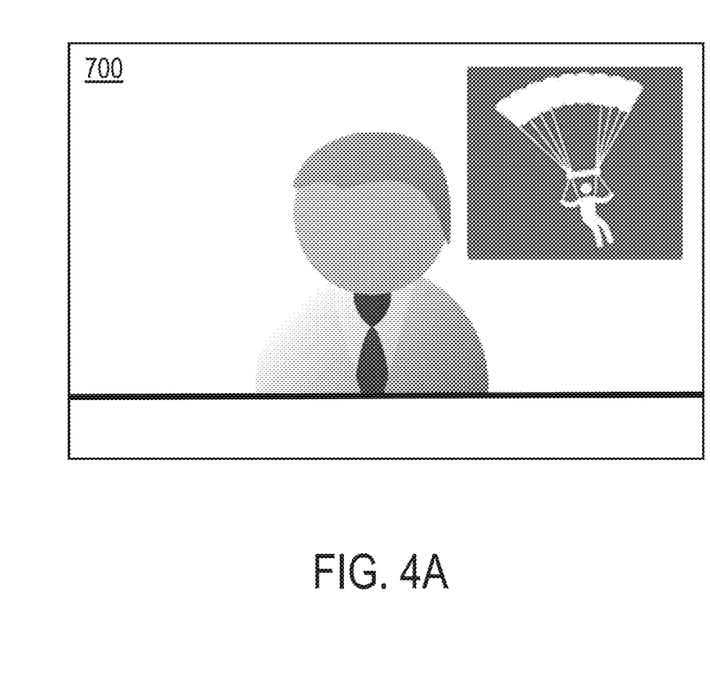
FIG. 4A illustrates an example frame of a piece of content.

FIG. 4A illustrates an example frame 700 of a piece of content. As shown in FIG. 4A, the frame 700 includes a scene involving a sports news anchor sitting behind a desk and reporting a sky diving event. The frame 700 does not include any product placement.

Figure 4B:
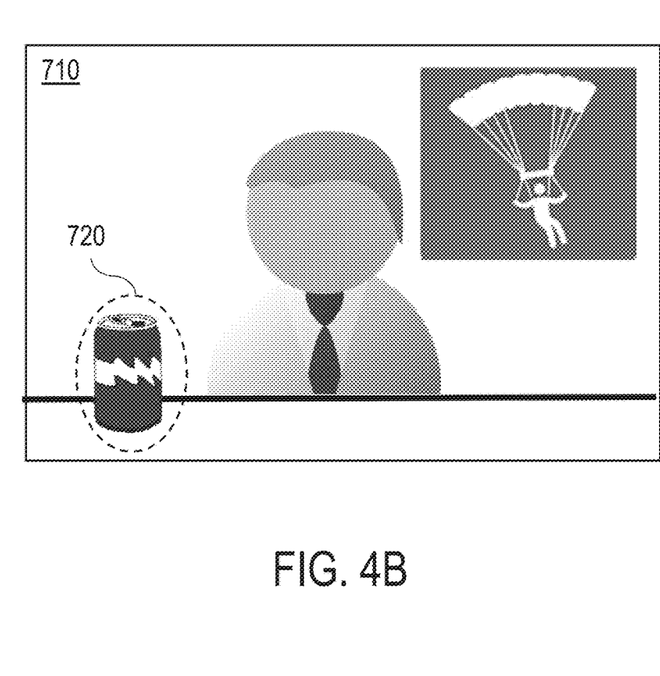
FIG. 4B illustrates an example augmented frame of a piece of content, in one or more embodiments.

FIG. 4B illustrates an augmented frame 710 of a piece of content, in one or more embodiments. The augmented frame 710 includes the same scene included in the frame 700 (FIG. 4A) but with the insertion of a can object 720 representing an energy drink of a particular brand. The can object 720 is a product placement that is placed on the desk so that the can object 720 appears natural to a viewer (as cans on a desk/table is a natural occurrence).

Figure 5:
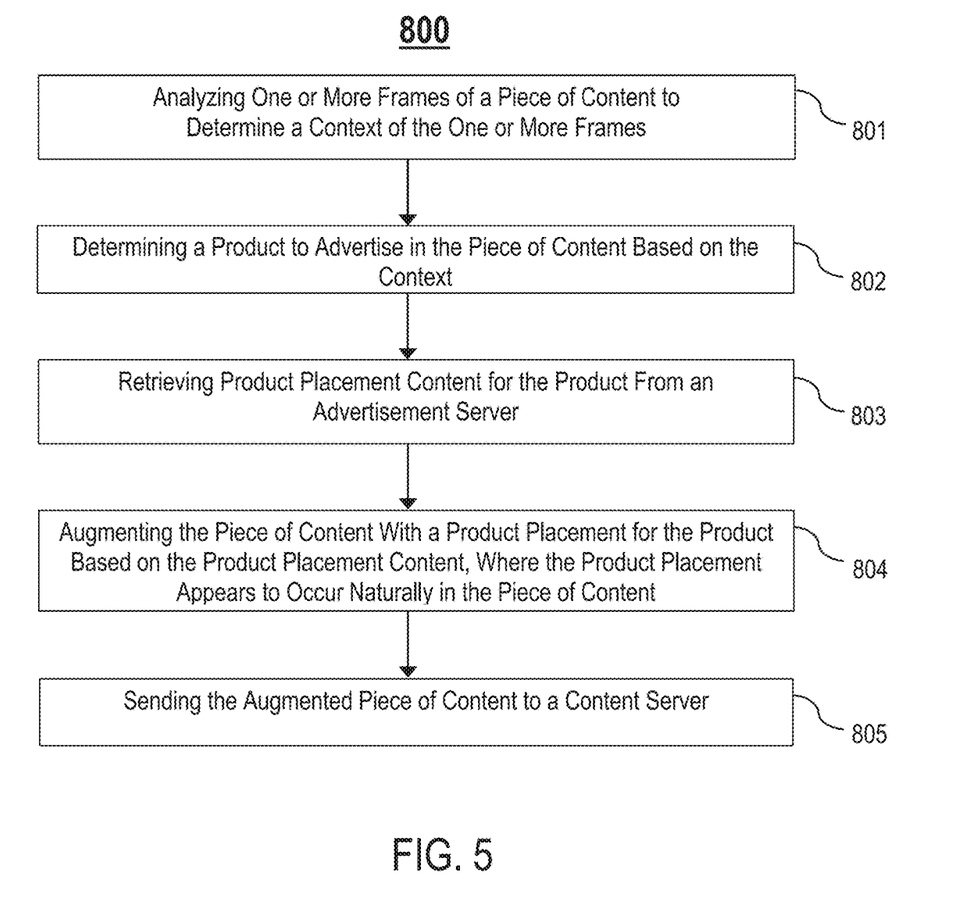
FIG. 5 is a flowchart of an example process for augmenting content with context based advertising, in one or more embodiments.

FIG. 5 is a flowchart of an example process 800 for augmenting content with context based advertising, in one or more embodiments. In process block 801, analyze one or more frames of a piece of content to determine a context of the one or more frames. In process block 802, determine a product to advertise in the piece of content based on the context. In process block 803, retrieve product placement content for the product from an advertisement server. In process block 804, augment the piece of content with a product placement for the product based on the product placement content, where the product placement appears to occur naturally in the piece of content. In process block 805, send the augmented piece of content to a content server.

In one embodiment, process blocks 801-805 may be performed by at least one of the context extraction system 200 and the natural augmentation system 300.

Figure 6:
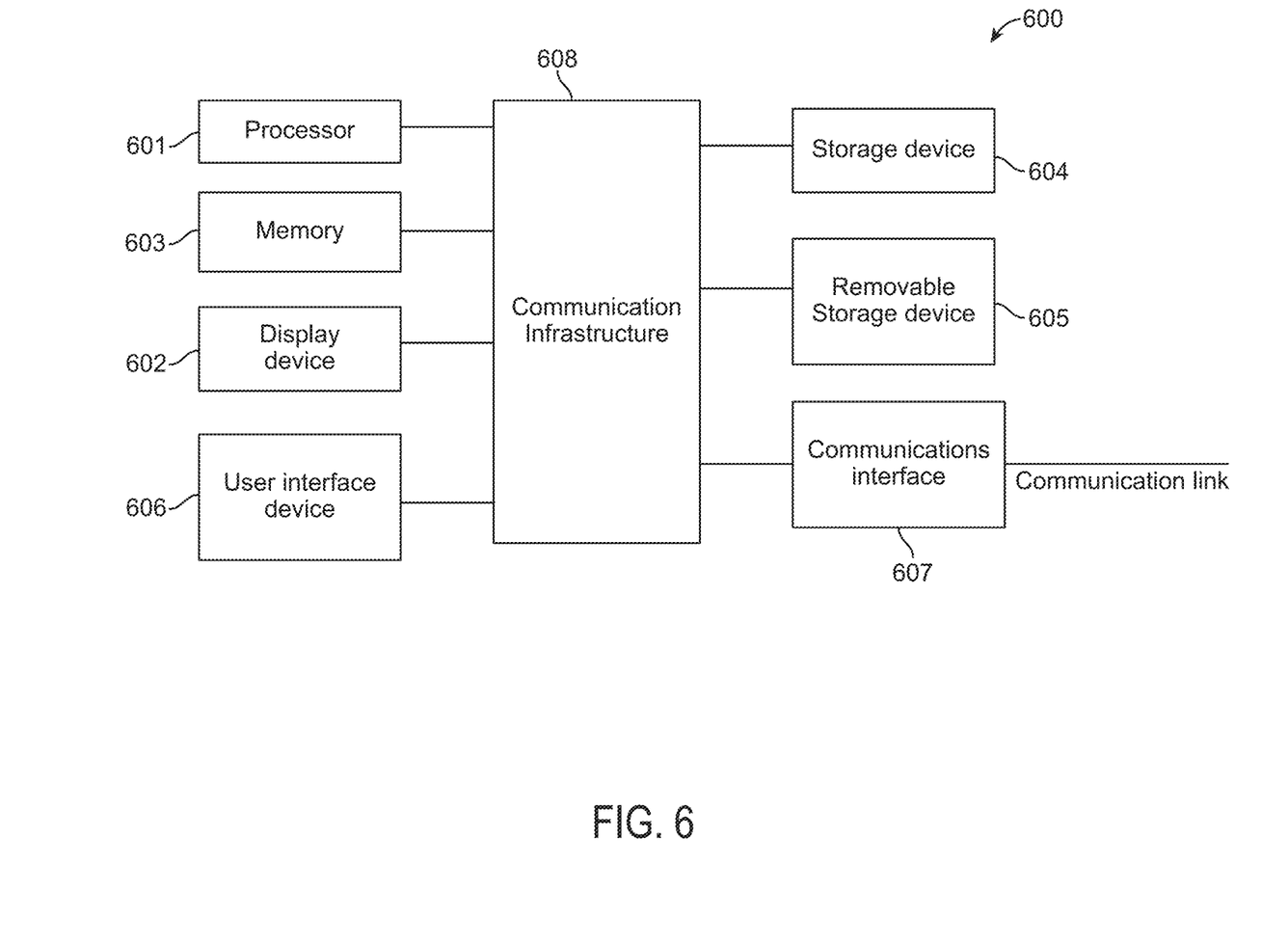
FIG. 6 is an exemplary high-level block diagram showing an information processing system comprising a computer system useful for implementing disclosed embodiments.

FIG. 6 is a high-level block diagram showing an information processing system comprising a computer system 600 useful for implementing the disclosed embodiments. Computer system 600 may be incorporated in a content creation device 100 or a content consumption device 450. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 800 (FIG. 8) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures or concurrently.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software or micro-code) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including a product oriented programming language such as Java, Smalltalk, C++ or the like and conventional procedural programming languages, such as the "C" programming language or similar programming languages. The program code may execute entirely on the viewer's computer, partly on the viewer's computer, as a stand-alone software package, partly on the viewer's computer and partly on a remote computer or entirely on the remote computer or server. In the latter scenario, the remote computer may be connected to the viewer's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof, however, other versions are possible. Therefore, the spirit and scope of the appended claims should not be limited to the description of the preferred versions contained herein.

What is claimed is:

1. A method comprising:
analyzing one or more frames of a piece of content to determine context information associated with the one or more frames, wherein the context information comprises one or more descriptors related to a scene occurring in the one or more frames, and the one or more descriptors identify the scene and its context;
determining a product to advertise in the piece of content by determining a product relevant to the scene based on the one or more descriptors; and
augmenting the piece of content with a product placement for the product, wherein the product placement appears to occur naturally in the piece of content.

2. The method of claim 1, further comprising:
retrieving product placement content for the product from an advertisement server.

3. The method of claim 1, wherein analyzing one or more frames of a piece of content comprises:
applying one or more vision based scene modeling techniques to the one or more frames to extract one or more high-level semantics from the one or more frames;
extracting sensor based contextual information from sensor data associated with the one or more frames; and
generating a scene profile for the one or more frames based on the one or more high-level semantics and the sensor based contextual information, wherein the scene profile comprises the one or more descriptors.

4. The method of claim 3, wherein the one or more vision based scene modeling techniques comprise at least one of scene annotation or scene classification.

5. The method of claim 3, wherein determining a product to advertise in the piece of content comprises:
mapping the scene profile to one or more brand profiles for one or more products.

6. The method of claim 2, wherein augmenting the piece of content with a product placement for the product comprises:
extracting structural, depth and pose information from the one or more frames;
tracking one or more changes in orientation and perspective during one or more scene transitions; and
rendering the product placement content based on the structural, depth and pose information and the one or more changes tracked to align the product placement content with one or more objects occurring in the one or more frames.

7. The method of claim 6, wherein the rendering comprises modifying one of scale, rotation or illumination of the product placement content relative to the one or more objects.

8. The method of claim 1, further comprising:
uploading the augmented piece of content to a content server.

9. The method of claim 1, wherein the piece of content is user generated.

10. The method of claim 9, further comprising:
sharing advertisement revenue associated with the product placement with a creator of the piece of content.

11. The method of claim 1, wherein the piece of content is one or stored media content or a live stream of media content.

12. A system, comprising:
at least one processor; and
a non-transitory processor-readable memory device storing instructions that when executed by the at least one processor causes the at least one processor to perform operations including:
analyzing one or more frames of a piece of content to determine context information associated with the one or more frames, wherein the context information comprises one or more descriptors related to a scene occurring in the one or more frames, and the one or more descriptors identify the scene and its context;
determining a product to advertise in the piece of content by determining a product relevant to the scene based on the one or more descriptors; and
augmenting the piece of content with a product placement for the product, wherein the product placement appears to occur naturally in the piece of content.

13. The system of claim 12, wherein the operations further comprise:
retrieving product placement content for the product from an advertisement server.

14. The system of claim 12, wherein analyzing one or more frames of a piece of content comprises:
applying one or more vision based scene modeling techniques to the one or more frames to extract one or more high-level semantics from the one or more frames;
extracting sensor based contextual information from sensor data associated with the one or more frames; and
generating a scene profile for the one or more frames based on the one or more high-level semantics and the sensor based contextual information, wherein the scene profile comprises the one or more descriptors.

15. The system of claim 14, wherein the one or more vision based scene modeling techniques comprise at least one of scene annotation or scene classification.

16. The system of claim 14, wherein determining a product to advertise in the piece of content comprises:
mapping the scene profile to one or more brand profiles for one or more products.

17. The system of claim 13, wherein augmenting the piece of content with a product placement for the product comprises:
extracting structural, depth and pose information from the one or more frames;
tracking one or more changes in orientation and perspective during one or more scene transitions; and
rendering the product placement content based on the structural, depth and pose information and the one or more changes tracked to align the product placement content with one or more objects occurring in the one or more frames.

18. The system of claim 17, wherein the rendering comprises modifying one of scale, rotation or illumination of the product placement content relative to the one or more objects.

19. A non-transitory computer readable storage medium including instructions to perform a method comprising:
analyzing one or more frames of a piece of content to determine context information associated with the one or more frames, wherein the context information comprises one or more descriptors related to a scene occurring in the one or more frames, and the one or more descriptors identify the scene and its context;
determining a product to advertise in the piece of content by determining a product relevant to the scene based on the one or more descriptors; and
augmenting the piece of content with a product placement for the product, wherein the product placement appears to occur naturally in the piece of content.

20. The computer readable storage medium of claim 19, wherein analyzing one or more frames of a piece of content comprises:
applying one or more vision based scene modeling techniques to the one or more frames to extract one or more high-level semantics from the one or more frames;
extracting sensor based contextual information from sensor data associated with the one or more frames; and
generating a scene profile for the one or more frames based on the one or more high-level semantics and the sensor based contextual information, wherein the scene profile comprises one or more descriptors of the one or more frames.

21. The computer readable storage medium of claim 19, wherein augmenting the piece of content with a product placement for the product comprises:
extracting structural, depth and pose information from the one or more frames;
tracking one or more changes in orientation and perspective during one or more scene transitions; and
rendering the product placement content based on the structural, depth and pose information and the one or more changes tracked to align the product placement content with one or more objects occurring in the one or more frames.

22. The computer readable storage medium of claim 21, wherein the rendering comprises modifying one of scale, rotation or illumination of the product placement content relative to the one or more objects.

23. The computer readable storage medium of claim 19, wherein the method further comprises:
sharing advertisement revenue associated with the product placement with a creator of the piece of content.

24. A method comprising:
gathering contextual information associated with an electronic signage, wherein the contextual information comprises one or more descriptors related to an environment of the electronic signage, and the one or more descriptors identify the environment and its context;
determining a product to advertise on the electronic signage by determining a product relevant to the environment based on the one or more descriptors; and
updating a display of the electronic signage with product placement content for the product.

25. The method of claim 24, wherein the contextual information is indicative of at least one of: temperature of the environment, weather at the environment, a current event relevant to a location of the electronic signage, or an audience member within proximity of the electronic signage.

* * * * *